United States Patent [19]

Washizu et al.

[11] Patent Number: 5,076,518
[45] Date of Patent: Dec. 31, 1991

[54] STRUCTURE FOR SECURING PIPES TOGETHER USING BRACKET BODY

[75] Inventors: Katsushi Washizu, Numazu; Yuji Miyauchi, Tagata, both of Japan

[73] Assignee: Usui Kokusai Sangyo Kaisha Ltd., Japan

[21] Appl. No.: 618,677

[22] Filed: Nov. 27, 1990

[30] Foreign Application Priority Data

Nov. 29, 1989 [JP] Japan .................................. 1-138188

[51] Int. Cl.$^5$ .............................................. F16L 3/22
[52] U.S. Cl. ................................................. 248/68.1
[58] Field of Search .................... 248/68.1, 69, 65, 49; 285/137.1, 284; 156/246; 264/328.1

[56] References Cited

U.S. PATENT DOCUMENTS

| | | | |
|---|---|---|---|
| 1,881,913 | 10/1932 | Parker | 285/284 X |
| 2,366,041 | 12/1944 | Morehouse | 248/68.1 X |
| 2,394,240 | 2/1946 | Harrison | 248/68.1 |
| 2,394,363 | 2/1946 | Bynoe | 248/68.1 X |
| 4,224,721 | 9/1980 | Ohlson | 248/68.1 X |
| 4,381,764 | 5/1983 | Wojcik | 248/68.1 X |
| 4,589,618 | 5/1986 | Fournier | 248/68.1 |
| 4,884,920 | 12/1989 | Perazzi | 405/284 |

Primary Examiner—Ramon O. Ramirez
Attorney, Agent, or Firm—ANthony J. Casella; Gerald E. Hespos

[57] ABSTRACT

A securing structure is used in securing a plurality of pipes of comparatively small diameter together. With each pipe having an expanded portion in a straight section thereof, a bracket body is injection-molded from resin such that the expanded portion and its vicinity of each pipe are embedded in the bracket body.

7 Claims, 1 Drawing Sheet

PRIOR ART

STRUCTURE FOR SECURING PIPES TOGETHER USING BRACKET BODY

BACKGROUND OF THE INVENTION

1. Field of the Invention

This invention relates to an improvement of a structure for securing pipes together using a bracket body.

2. Description of the Prior Art

Metal or resin pipes of comparatively small diameter (no greater than about 15 mm) are widely used as fuel pipes, vacuum pipes, hydraulic pipes, etc. in various machines such as cars.

To secure such pipes together, conventionally, a bracket member 11 made of resin as shown in FIG. 4 is used which is formed with a plurality of grip grooves 12. Specifically, the respective straight sections of a plurality of pipes arranged side by side are pressure-fitted in the corresponding grip grooves 12.

In the foregoing structure wherein the respective straight sections of the pipes arranged side by side are pressure-fitted in the grip grooves 12 of the bracket member 11 molded beforehand, the work of fitting the individual pipes in the grip grooves 12 is troublesome, lowering work efficiency. Further, due to improper fitting, aging and fatigue of a grip portion of each groove 12, vibration, etc., each pipe tends to shift axially or circumferentially or come out of the grip groove. That is, the gripped condition of each pipe is uncertain.

SUMMARY OF THE INVENTION

It is an object of the present invention to provide a structure for securing pipes together using a bracket body which can reliably secure pipes together without the need of troublesome fitting work and without any fear of displacement and detachment.

To accomplish the foregoing object, the present invention provides a structure for securing pipes together each having an annularly expanded portion in a straight section thereof, which is characterized in that a bracket body is injection-molded from resin such that the expanded portion and its vicinity of each pipe are embedded in the bracket body. Each pipe may have a polygonally expanded portion.

Since the expanded portions of the pipes are embedded together in the bracket body, there is no need of troublesome fitting work, enhancing work efficiency, there is no fear of axial/circumferential displacement and detachment of the pipes even under vibration, and the pipes are tightly secured together.

DETAILED DESCRIPTION OF THE PREFERRED EMBODIMENTS

Figure 1:
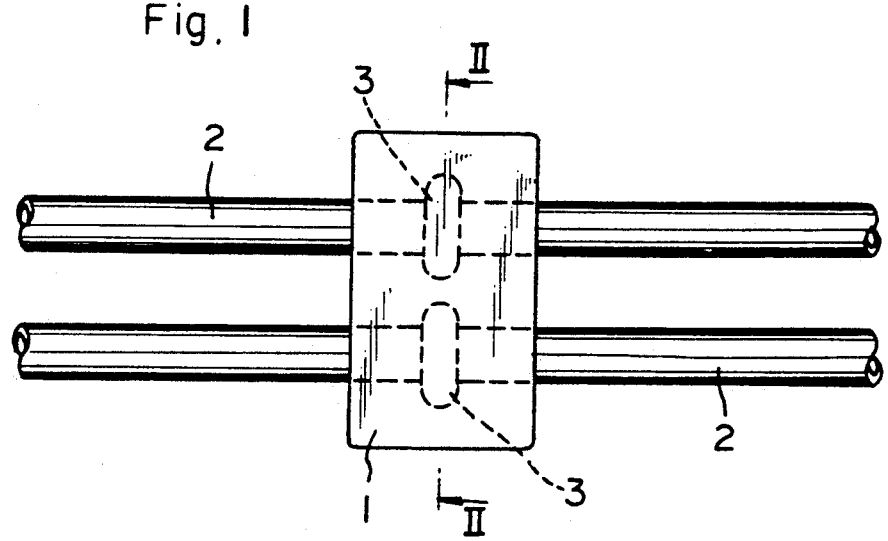
FIG. 1 is a plan view showing a structure for securing pipes together using a bracket body according to an embodiment of the present invention.
Figure 2:
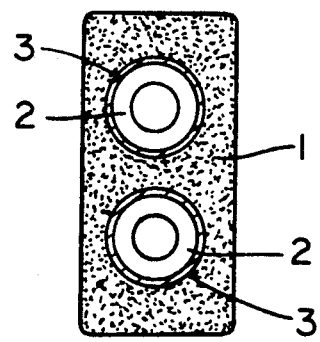
FIG. 2 is a sectional view taken along line II—II in FIG. 1.
Figure 3:
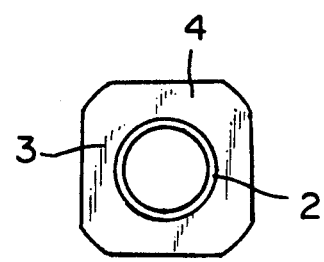
FIG. 3 is an enlarged sectional view showing another embodiment of the present invention.
Figure 4:
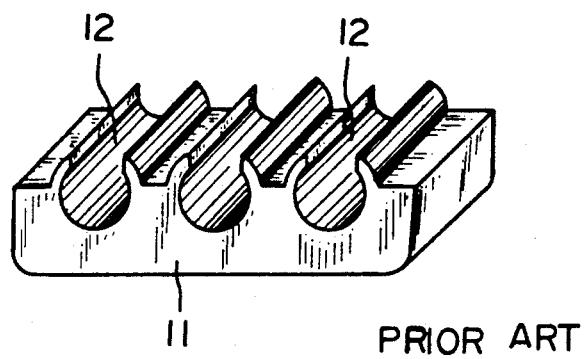
FIG. 4 is a perspective view showing a conventional bracket member.

In FIGS. 1 through 3, a bracket body 1 is made of thermoplastic resin, such as nylon, polyethylene, polypropylene, polyacetal and ABS. A pipe 2 is made of metal or resin, whose diameter is on the order of 15 mm or less. A peripheral portion of the straight pipe 2 is expanded as to define an annularly expanded portion 3. A plurality of such expanded portions 3 are arranged side by side and subjected to injection molding such that these expanded portions 3 and their vicinities are embedded together in the bracket body 1 thus molded. A modification of the expanded portion 3 is designated by "4" in FIG. 3, which is a polygonally expanded portion and is advantageous for the purpose of preventing circumferential displacement of the pipe.

As described above, according to the present invention, a plurality of pipes 2 are secured together when the bracket body 1 is molded, so that the expanded portion 3 and its vicinity of each pipe are embedded in the bracket body 1. Therefore, the pipes can be readily and reliably secured together without the need of troublesome fitting work, there is no fear of axial/circumferential displacement and detachment of the pipes even under vibration, and there is provided a reliable structure in which the pipes are tightly secured together by the bracket body.

What is claimed is:

1. A structure for securing pipes together using a bracket body, said structure comprising: a plurality of pipes, each said pipe having an expanded portion in a straight section thereof, and having sections of smaller cross section on either side of said expanded portion, a bracket body injection-molded from resin to surround the pipes such that the expanded portion of each said pipe and the smaller cross section portion of each said pipe in the vicinity of each respective expanded portion are imbedded in the injection-molded bracket body.

2. A securing structure according to claim 1, wherein the expanded portion of each said pipe defines an annularly expanded portion.

3. A securing structure according to claim 1 wherein the bracket body is molded from a resin selected from the group consisting of nylon, polyethylene, polypropylene, polyacetal, or ABS.

4. A securing structure according to claim 1, wherein each pipe is made of metal.

5. A securing structure according to claim 1, wherein each said pipe is made of resin.

6. A securing structure according to claim 1 wherein the expanded portion of each said pipe is generally polygonal.

7. A securing structure according to claim 1 wherein said pipes are generally parallel to one another.

* * * * *